(12) United States Patent
Kondo et al.

(10) Patent No.: US 11,110,830 B2
(45) Date of Patent: Sep. 7, 2021

(54) VEHICULAR SEAT

(71) Applicant: TOYOTA BOSHOKU KABUSHIKI KAISHA, Aichi-ken (JP)

(72) Inventors: Shutaro Kondo, Aichi-ken (JP); Masaya Inukai, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/925,789

(22) Filed: Jul. 10, 2020

(65) Prior Publication Data

US 2021/0009014 A1 Jan. 14, 2021

(30) Foreign Application Priority Data

Jul. 12, 2019 (JP) .............................. JP2019-130213

(51) Int. Cl.
  *B60N 2/02* (2006.01)
  *B60N 2/36* (2006.01)
  *B60N 2/30* (2006.01)
  *B60N 2/90* (2018.01)

(52) U.S. Cl.
  CPC .................. *B60N 2/30* (2013.01); *B60N 2/90* (2018.02)

(58) Field of Classification Search
  CPC ...... B60N 2/206; B60N 2/305; B60N 2/3065; B60N 2/3011; B60N 2/3047; B60N 2/20; B60N 2/3013; B60N 2/06; B60N 2/90
  See application file for complete search history.

(56) References Cited

U.S. PATENT DOCUMENTS

| | | | | |
|---|---|---|---|---|
| 5,658,046 A * | 8/1997 | Rus | ...................... | B60N 2/3013 16/4 |
| 6,793,265 B2 * | 9/2004 | Kamida | ............... | B60N 2/3011 296/64 |
| 6,817,660 B2 * | 11/2004 | Ito | ........................ | B60N 2/3013 296/65.09 |
| 7,216,916 B2 * | 5/2007 | Czerwinski | .............. | B60N 2/06 296/24.43 |
| 8,398,164 B2 * | 3/2013 | Baker | .................... | B60N 2/305 297/15 |
| 8,505,999 B2 * | 8/2013 | Whalen | .................... | B60N 2/36 296/65.09 |
| 9,539,917 B2 * | 1/2017 | Toyama | ................... | B60N 2/20 |

(Continued)

FOREIGN PATENT DOCUMENTS

JP 5870892 1/2016

*Primary Examiner* — Shin H Kim
(74) *Attorney, Agent, or Firm* — Greenblum & Bernstein, P.L.C.

(57) ABSTRACT

A rear seat includes a support plate and a planar carpet laid between a lower part of a back lining of a seatback and a deck board located behind the seatback. The support plate is configured to support the carpet from underneath when the seatback is collapsed forward. The support plate includes a fixing plate part and a movable plate part. The fixing plate part is fixed on a back lining surface of the seatback and abuts the rear side of the carpet when the seatback is collapsed forward. The movable plate part is aligned with the fixing plate part, in the seat width direction, and is joined to the rear surface of the carpet. The movable plate part covers the seat side shield. The movable plate part abuts the seat side shield from behind, and shifts away from the fixing plate part when the seatback is reclined reward.

19 Claims, 7 Drawing Sheets

(56) References Cited

U.S. PATENT DOCUMENTS

| | | | | |
|---|---|---|---|---|
| 2006/0255611 A1* | 11/2006 | Smith | .................... | B60R 5/04 |
| | | | | 296/37.16 |
| 2008/0185866 A1* | 8/2008 | Tarrant | .................... | B60R 5/04 |
| | | | | 296/97.22 |
| 2010/0327635 A1* | 12/2010 | Whalen | .................... | B60N 2/36 |
| | | | | 297/129 |
| 2011/0049958 A1* | 3/2011 | Ma | .................... | B60N 2/309 |
| | | | | 297/378.12 |
| 2011/0248523 A1* | 10/2011 | Aebker | .................... | B60N 2/36 |
| | | | | 296/66 |
| 2012/0049588 A1* | 3/2012 | Baker | .................... | B60N 2/3011 |
| | | | | 297/217.1 |
| 2012/0056460 A1* | 3/2012 | Baker | .................... | B60N 2/3011 |
| | | | | 297/331 |
| 2012/0139314 A1* | 6/2012 | Jeong | .................... | B60N 2/2209 |
| | | | | 297/342 |
| 2016/0052425 A1* | 2/2016 | Akutsu | .................... | B60N 2/3047 |
| | | | | 297/341 |

* cited by examiner

VEHICULAR SEAT

CROSS-REFERENCE TO RELATED APPLICATIONS

This application claims priority to Japanese patent application serial number 2019-130213, filed Jul. 12, 2019, the contents of which are incorporated herein by reference in its entirety for all purposes.

BACKGROUND

The present invention relates to a vehicle seat. For example, a vehicle seat may include a planar gap concealing member laid between a lower part of a back lining of a seatback and a deck board therebehind. A support plate is provided for supporting the gap concealing member from underneath when the seatback is collapsed forward.

A gap concealing member may be laid between a lower part of a back lining of a seatback and a deck board. The gap concealing member is made of a carpet material and deforms to correspond to a size change of a gap relative to the deck board, due to a reclining motion of the seatback. More specifically, the gap concealing member deforms so as to enter between the lower part of the back lining of the seat back and the deck board when the seat back is raised.

The gap concealing member is used as a floor surface when the seatback is collapsed forward. At this time, a side of the gap concealing member may the strike side shields, which cover a lower end of the seatback from the sides. Therefore, a support plate for ensuring rigidity is joined to a rear surface of the side of the gap concealing member. The support plate is configured to be separated from a backboard. The backboard is configured to cover the back lining surface of the seatback. This configuration prevents the support plate from striking the side shields when the seatback is reclined backward.

The support plate may be positioned in a lower area of the seatback, located below the backboard. The support plate may have a width similar to the width of the seatback. The support plate may come in contact with the side shields, from the back, as the seatback is reclined backward. When the seatback is further reclined backward, the support plate may be pushed rearward, compared to the point where it was first brought in contact with the side shields. This may cause the support plate to interfere with a projecting member, such as a storage box provided under the deck board. It has thus been conventionally desired to provide a vehicle seat that includes a gap concealing member having a support plate on a rear surface, where the gap concealing member is less likely to be subjected to interference by a component under the deck board.

SUMMARY

According to one aspect of the present disclosure, a vehicle seat may include a planar gap concealing member and a support plate. The gap concealing member may be laid between a lower part of a back lining of a seatback and a deck board located behind the seatback. The support plate is configured to support the gap concealing member from underneath when the seatback is collapsed forward. The support plate may include a fixing plate part and a movable plate part. The fixing plate part may be fixed on a back lining surface of the seatback and may abut the rear side of the gap concealing member when the seatback is collapsed forward. The movable plate part may be aligned with the fixing plate part in the width direction when the seat is collapsed forward. The movable plate part may be joined to the rear surface of the gap concealing member. The movable plate part may cover the seat side shield, which is configured to cover the side of the seat main body, when the seatback is collapsed forward. The movable plate part may abut the seat side shields from behind, and may shift away from the fixing plate part when the seatback is reclined rearward.

With the above structure, the gap concealing member may be configured to conceal the gap between the seatback and the deck board. The gap concealing member may be bent, for example, when the seatback is moved from the collapsed-forward state to the reclined-rearward state. For example, the gap concealing member may be deformed so as to have a downwardly bent part. The movable plate part of the support plate may be abutted to the seat side shields. The fixing plate part of the support plate, which does not abut to the seat side shields, may be tilted with the seatback so as to move away from the movable plate part. At this time, the gap concealing member may bend relatively flexible. The gap concealing member may thus be bent without being subjected to strong interference by the seat side shields.

According to another aspect of the present disclosure, the fixing plate part may extend from the backboard, which covers the back lining surface of the seatback. Therefore, the fixing plate part may be formed utilizing the structure of the backboard. For example, the fixing plate part and the backboard may be formed as one member or may be integrally formed.

According to another aspect of the present disclosure, the movable plate part may extend from an attachment location, where the gap concealing member is attached to the back lining surface of the seat back, toward the deck board. A first end of the movable plate part may be joined to the rear surface of the gap concealing member near the attached location. A second end of the movable plate part is not joined to the rear surface of the gap concealing member at the location far from the attached location.

Therefore, the force, which causes the gap concealing member to be pulled by the seatback, is smaller when the seatback is raised, as compared to the case where the entire area of the movable plate part is joined to the gap concealing member.

According to another aspect of the present disclosure, the fixing plate part may include a claw portion, which abuts the movable plate part from the bottom and supports the movable plate part when the seatback is collapsed forward. The claw portion thus supports the movable plate part so that the rigidity of the support plate is appropriately enhanced.

According to another aspect of the present disclosure, the seat side shield may be positioned below the back lining surface of the seatback when the seatback is collapsed forward. This may prevent the movable plate part, which covers the seat side shield, from pushing the gap concealing member upward when the seatback is collapsed forward. It is thus possible, for example, to make the gap concealing member to be more flush with the deck board.

DETAILED DESCRIPTION

Hereinafter, one embodiment of the present disclosure will be described with reference to FIGS. 1-7. In the following description, directions such as frontward/rearward/upward/downward/leftward/rightward indicated in each of drawings will be used. Hereinafter, each of the directions may, for example, correspond to a traveling direction of an automobile.

Figure 1:
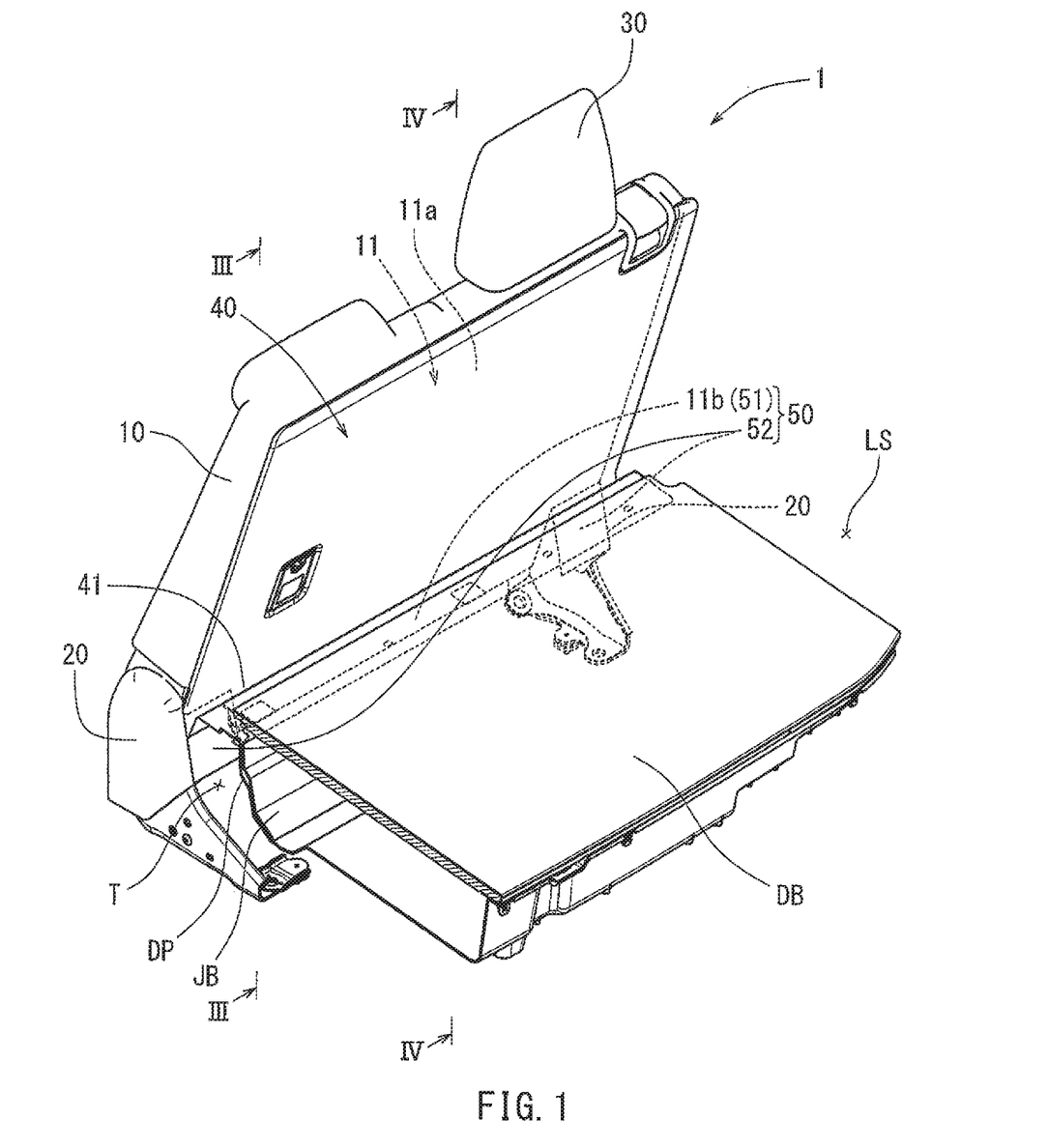
FIG. 1 is a perspective view of a vehicle seat according to a first embodiment.

A vehicle seat, as shown in FIG. 1, may be located, for example, at the rearmost row of an automobile and be divided into left and right seats by a 6:4 ratio. A seat (e.g., a rear seat 1) shown in FIG. 1 may constitute 60% of the rearmost row of seats. A luggage compartment LS may be formed on a rear side of a rear seat 1. The rear seat 1 may include a seat cushion (not shown) for supporting an occupant's buttocks and a seatback (which may be a part of a seat main body) 10 for supporting an occupant's back. Both left and right sides of the seatback 10 may be covered by left and right seat side shields 20, respectively. A headrest 30 for supporting an occupant's head may be provided on an upper part of the seatback 10.

A lower end of the seatback 10, an embodiment of which is shown in FIG. 1, may be connected to a seat cushion (not shown) via a recliner (not shown). The recliner allows the seatback 10 to tilt in a frontward/rearward direction about the center of rotation 10R of the recliner and maintains the backrest angle of the seatback 10 at a predetermined angle. With the above structure, the seatback 10 may be held in a raised state and in a collapsed-forward state. In the raised state, a front surface of the seatback 10 is raised so as to be able to be used as a backrest surface. In the collapsed-forward state, a back lining surface of the seatback 10 may be flush with a floor surface of a luggage compartment LS. In other words, the back lining surface of the seatback 10 and an upper surface of the deck board DB may form a stepless floor surface. This allows the floor surface of the luggage compartment LS to be enlarged by an area the size of the back lining surface of the seatback 10.

Figure 2:
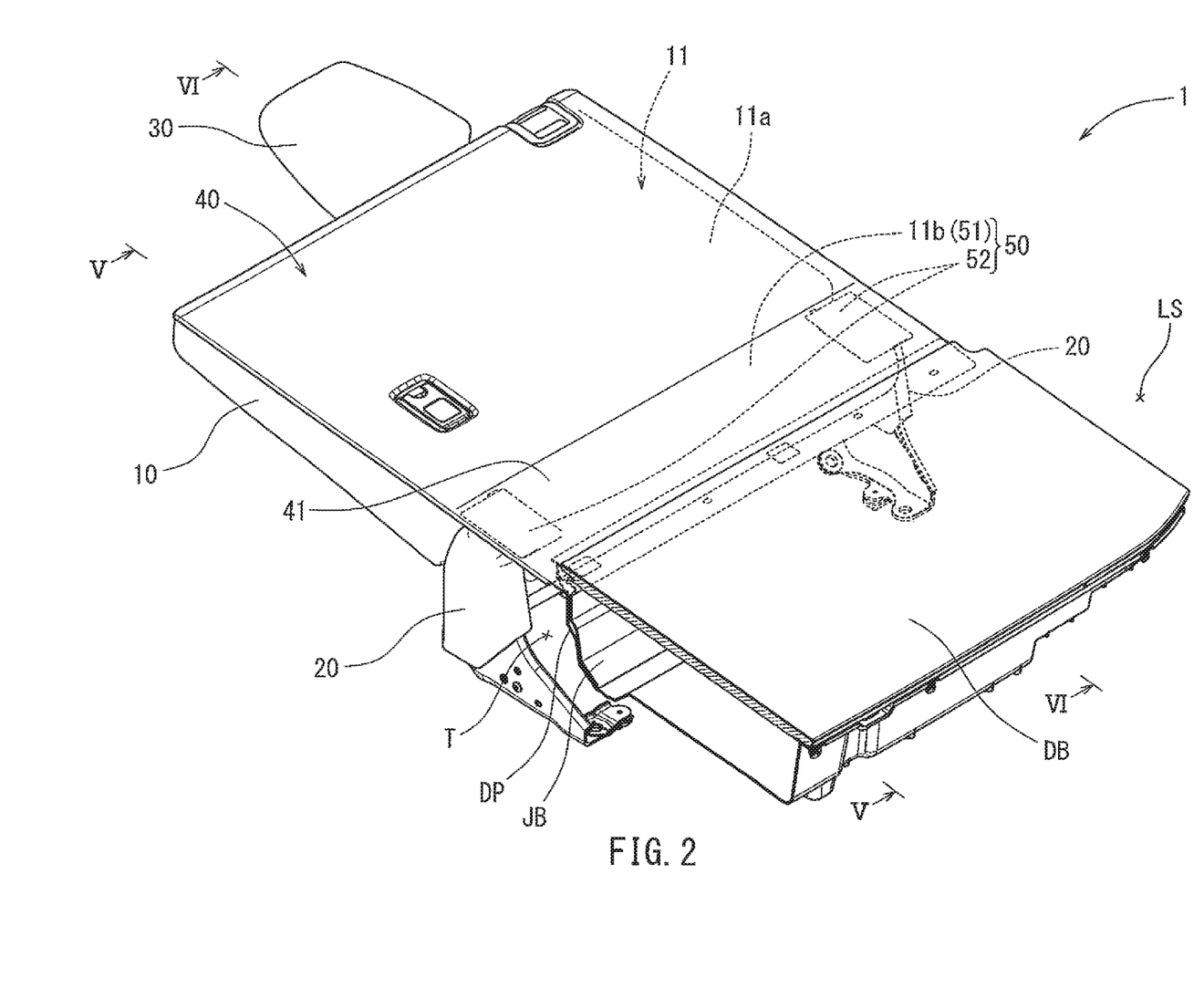
FIG. 2 is a perspective view illustrating the seatback of FIG. 1 when collapsed forward.
Figure 3:
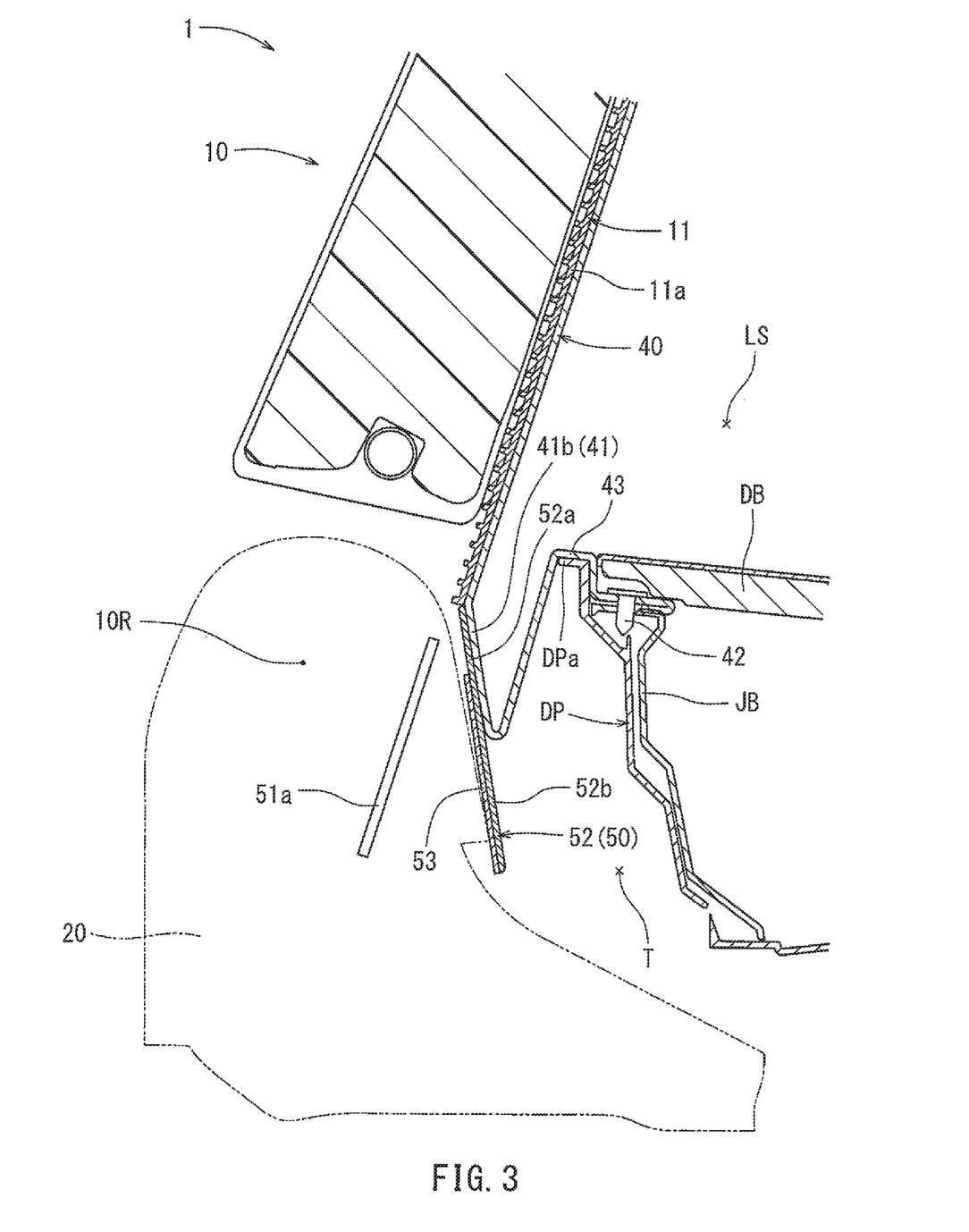
FIG. 3 is a cross-sectional view taken along line III-III in FIG. 1.

As shown in FIG. 3, a gap T may be provided between the seatback 10 and the deck board DB to avoid interference between these components during the tilting motion in the frontward/rearward direction of the seatback 10. The gap T may extend downward from the front side of the deck board DB between the seatback 10 and the deck board DB. A gap concealing member (e.g., a carpet 40 having a planer shape) may be laid between the seatback 10 and the deck board DB to cover the gap T. A support plate 50 may be provided on the rear side of the carpet 40, which is configured to support the carpet 40 from underneath when the seatback 10 is collapsed forward (e.g., see FIG. 2). The support plate 50 supports the carpet 40 when a part of the carpet 40 is used as a floor surface of the luggage compartment LS while the seatback 10 is collapsed forward. The support plate 50 may include a fixing plate part 51 and movable plate parts 52 joined to the carpet 40.

As shown in FIGS. 1 and 2, a backboard 11, which may be made of resin, may be fixed on the back lining surface of the seatback 10. A backboard 11 may be one panel member, which covers the back lining surface of the seatback 10 while avoiding the seat side shields 20. The backboard 11 may include a general surface part 11a as an upper area in a use position and an extension part 11b as a lower area. The general surface part 11a, which is on the back lining surface of the seatback 10, may be located in front of the seat side shields 20 in a collapsed-forward state. In other words, the general surface part 11a may cover the back lining surface of the seatback 10, except for the lower area of the seatback 10 located between the left and right seat side shields 20. The extension part 11b may extend from the general surface part 11a so as to cover the lower area of the back lining surface of the seatback 10. This extension part 11b may constitute a fixing plate part 51 of the support plate 50.

Figure 4:
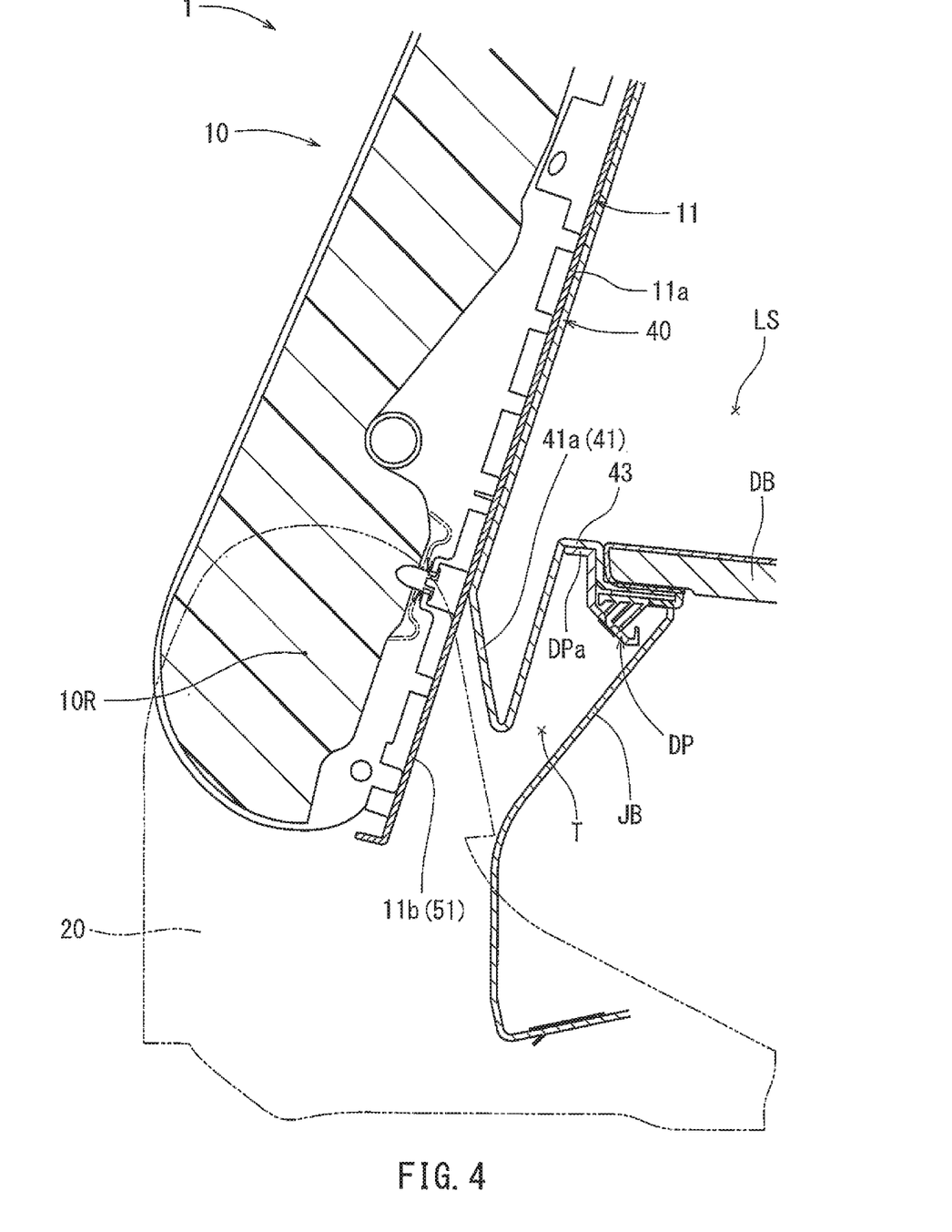
FIG. 4 is a cross-sectional view taken along line IV-IV in FIG. 1.
Figure 5:
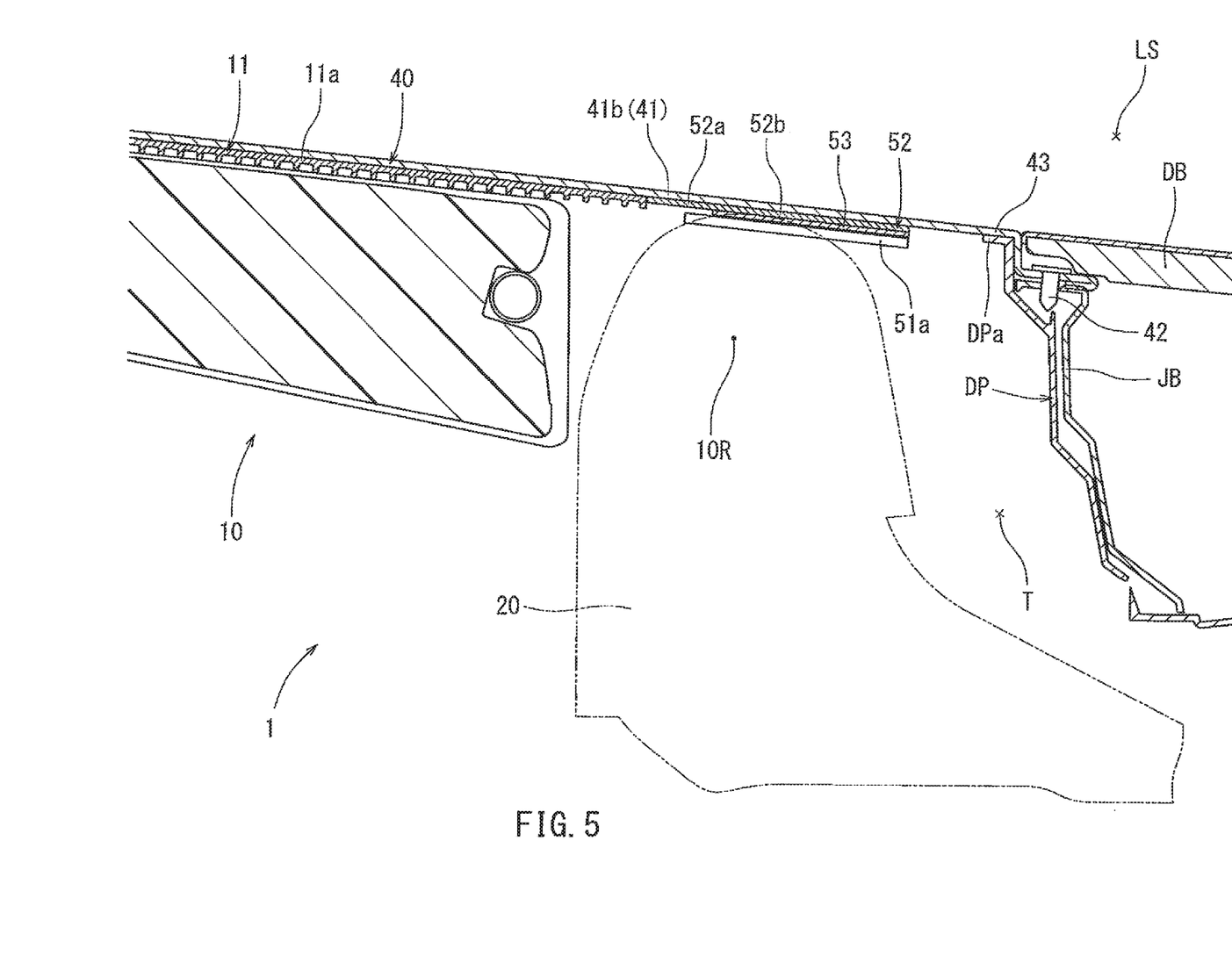
FIG. 5 is a cross-sectional view taken along line V-V in FIG. 2.
Figure 6:
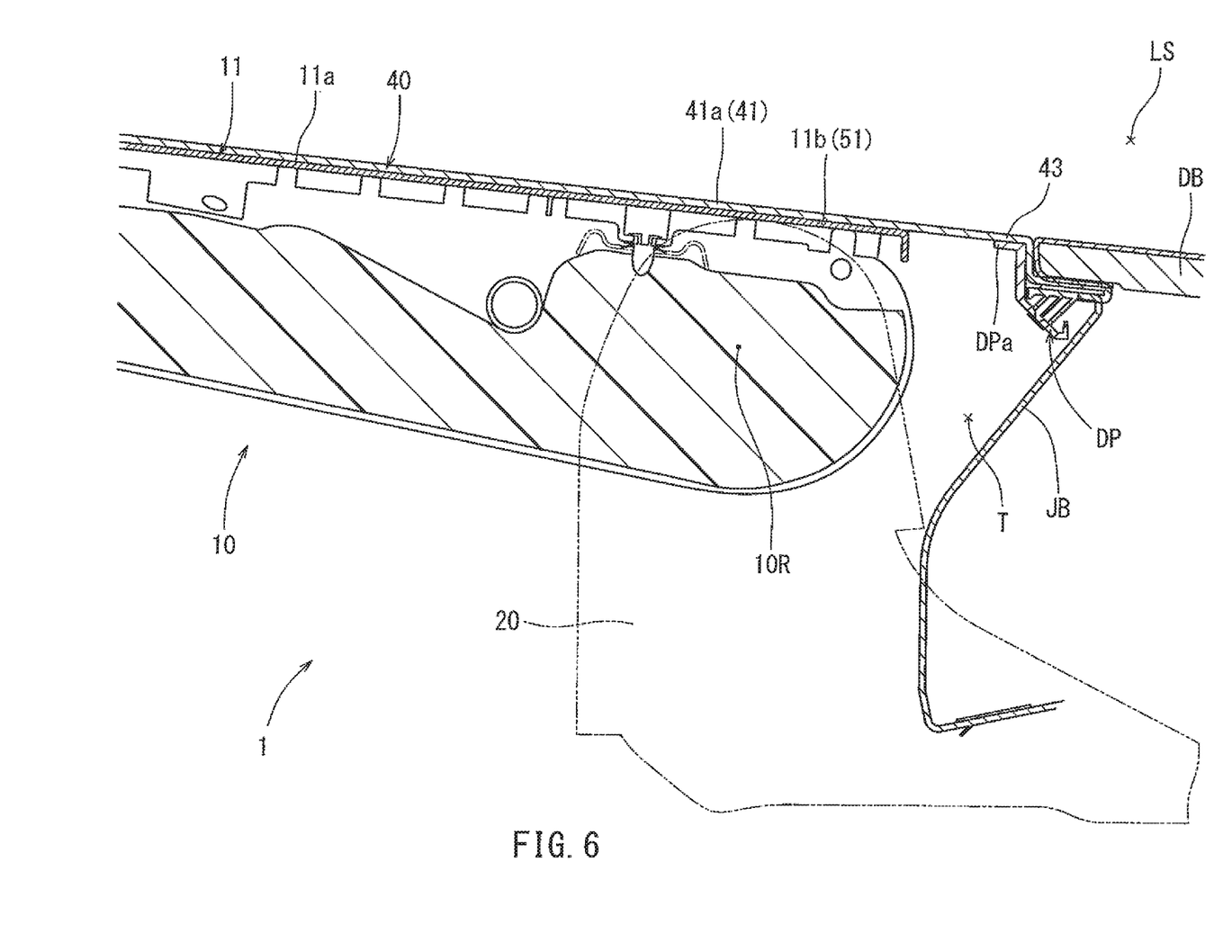
FIG. 6 is a cross-sectional view taken along line VI-VI in FIG. 2.
Figure 7:
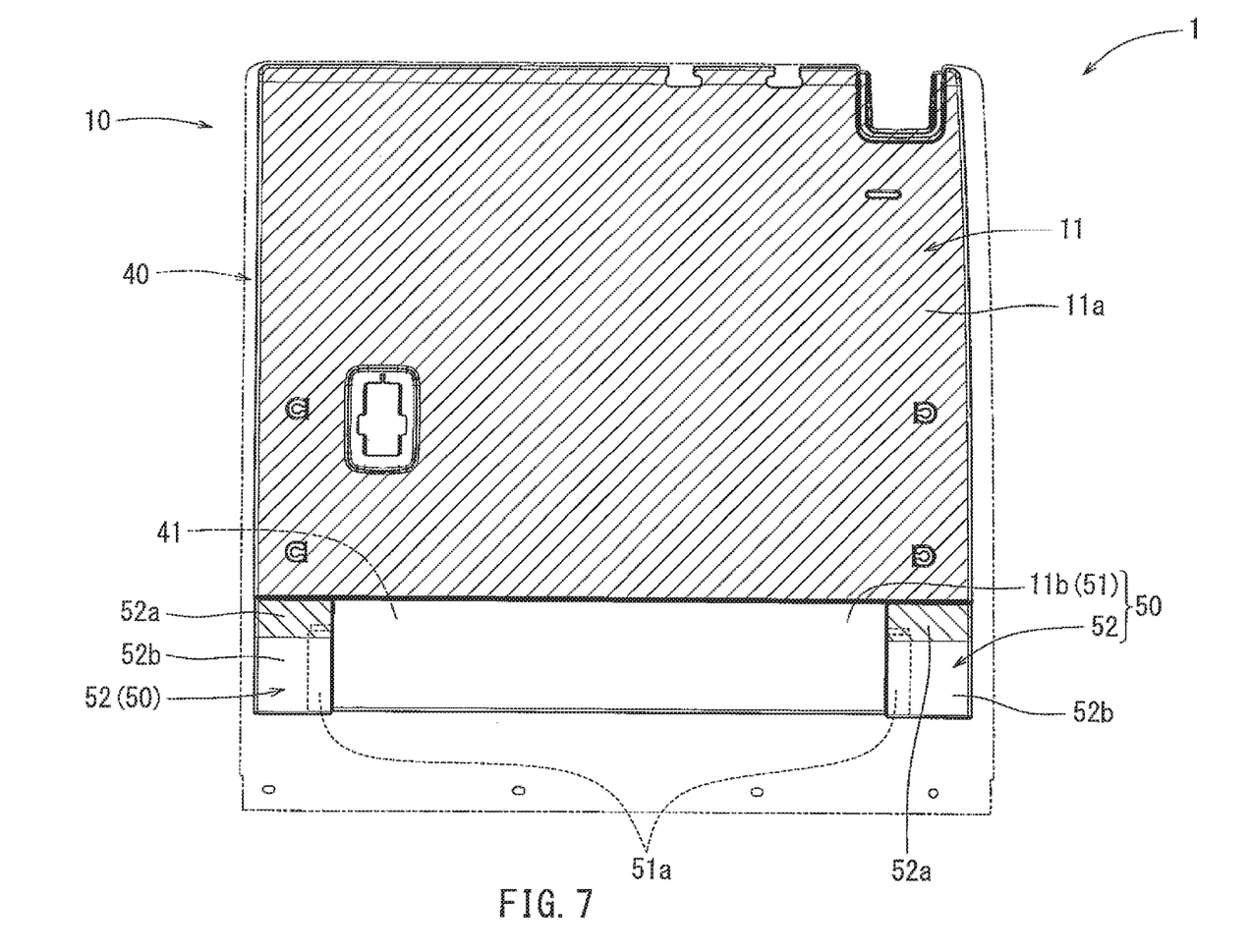
FIG. 7 is a rear view of the seatback of FIG. 1.

As shown in FIG. 7, the carpet 40 may be one surface material made of fabric, which is cut in substantially a rectangular shape. The carpet 40 may be surface joined on the general surface part 11a of the backboard 11 so as to be attached to the seatback 10. The carpet 40 may have an extension surface part 41 extending rearward from a portion joined with the general surface part 11a of the backboard 11 when the seatback 10 is collapsed forward. As shown in FIGS. 5 and 6, the extension surface part 41 may have a first cover surface part 41a, supported by the fixing plate part 51 from underneath, and a second cover surface part 41b, covering each of the seat side shields 20, respectively. The first cover surface part 41a is not joined to the fixing plate part 51 (as seen in FIG. 4).

As shown in FIG. 3, movable plate parts 52 of the support plate 50 may be provided on a back surface of each of the second cover surface parts 41b. Each of the movable plate parts 52 may include an area on a first end side (e.g., a joined area 52a), where they are joined to the back surface of the second cover surface part 41b, and an area on a second end side (e.g., an unjoined area 52b), where they are not joined to the back surface of the second cover surface part 41b. More specifically, the upper area of each of the movable plate parts 52, in the state where the seatback 10 is raised, corresponds to the joined area 52a. The lower area of each of the movable plate parts 52 corresponds to the unjoined area 52b. Each of the movable plate parts 52 integrally moves with the carpet in response to the tilting movement of the seatback 10 in the frontward/rearward direction, via the joined areas 52a. Therefore, as shown in FIG. 5, each of the movable plate parts 52 is located above each of the seat side shields 20 when the seatback 10 is collapsed forward. As shown in FIG. 7, the movable plate parts 52 are arranged on both left and right sides of the fixing plate part 51 in the seat width direction.

As shown in FIG. 5, the apex of each of the seat side shields 20 is located lower than the back lining surface of the seatback 10 in the collapsed-forward state. Therefore, the upper surface of each of the second cover surface parts 41b is made to be substantially flush with the back lining surface of the seatback 10 when the seatback 10 is collapsed forward. As shown in FIG. 7, each of claw portions 51a may extend outward in the width direction, from a part of the left and right ends of the fixing plate part 51. Specifically, each of the claw portions 51a may include a base portion extending downward from the left and right ends of the fixing plate parts 51 and a projecting piece projecting outward from the lower end of the base portion in the width direction of the seat in the collapsed-forward state of the seatback 10.

As shown in FIG. 5, the upper surfaces of the projecting pieces of the claw portions 51a may abut to the back surfaces of the movable plate parts 52 in the collapsed-forward state of the seatback 10. This enables the claw portions 51a to support the movable plate parts 52 from underneath in the area where they are not supported by the seat side shields 20. The movable plate parts 52 may thus be supported in a position in which the movable plate parts 52 are substantially flush with the fixing plate part 51 (see FIG. 7). The claw portions 51a may support the second cover surface parts 41b from underneath via the movable plate parts 52. A cushioning material 53, which may be made of fabric, may be provided on the back surface of the movable plate parts 52. The cushioning material 53 serves to relieve the impact caused by the claw portion 51a striking the movable plate parts 52 when the seatback 10 is collapsed forward. The cushioning material 53 may be, for example, a carpet, urethane, rubber, or the like.

As shown in FIG. 3, the second cover surface parts 41b may be shifted away from each of the unjoined areas 52b of each of the movable plate parts 52 when the seatback 10 is raised. This allows the second cover surface parts 41b to deform and to be folded in the frontward/rearward direction. Thereby, a deflection margin may be formed along the extension surface part 41 of the carpet 40. As a result, it is possible to prevent the unjoined areas 52b from pulling the carpet 40 when the seatback 10 is raised.

As shown in FIG. 3, a rear end of the carpet 40 may be fixed to a deck panel DP, which may be made of resin, and a storage box JB located under the deck board DB. Specifically, the rear end of the carpet 40 may be inserted under the deck board DB and fixed to the upper surface of the storage box JB via fixing pins 42. As shown in FIG. 4, the storage box JB projects downward and forward from the deck board DB in the center portion of the rear seat 1.

As shown in FIGS. 4 and 5, the deck panel DP may include a support portion DPa extending forward from the lower side of the deck board DB. The support portion DPa may be substantially flush with the upper surface of the deck board DB. The support portion DPa may support the extension surface part 43, which extends forward from the rear end of the carpet 40, from underneath. This allows the extension surface part 43 to be substantially flush with the upper surface of the deck board DB. The extension surface part 43 of the carpet 40 may connect the seatback 10 with the deck board DB so they are flush when the seatback 10 is collapsed forward.

Hereinafter, a motion of the carpet 40 and the support plate 50 when the seatback 10 is tilted in the frontward/rearward direction will be described. As shown in FIG. 2, when the seatback 10 is collapsed forward, the carpet 40 may be supported from underneath by the fixing plate part 51 and by each of the movable plate parts 52 of the support plate 50. As a result, the carpet 40 is made to be substantially flush with the upper surface of the deck board DB. Referring to FIG. 1, the fixing plate part 51 of the support plate 50 may slip into the gap T, defined between the seatback 10 and the deck board DB, when the seatback 10 is gradually raised, as also shown in FIG. 4. At this moment, the extension surface part 41 of the carpet 40 moves away from the fixing plate part 51. The extension surface part 41 of the carpet 40 may slip into the gap T between the seatback 10 and the deck board DB, while also being bent downward forming a valley-shaped fold.

As shown in FIG. 3, each of the movable plate parts 52 may abut the rear surface of each of the seat side shields 20 when the seatback 10 is raised up to a right angle. At this moment, the cushioning materials 53 provided on the rear surface of each of the movable plate parts 52 come in contact with the seat side shields 20, thereby relieving an impact between the movable plate parts 52 and the seat side shields 20. Referring to FIGS. 3 and 4, the movable plate parts 52 on the left and right sides may be separated from the fixing plate part 51. Therefore, when the seatback 10 is reclined further rearward, a lower part of the fixing plate part 51 moves forward such that the lower part of the fixing plate part 51 moves away from the movable plate parts 52.

As a result, as shown in FIG. 3, the carpet 40 may be bent downward with the front edge portion of the extension surface part 41 as a starting point. More specifically, the upper area of the carpet 40 may bend rearward with respect to the lower area of the carpet 40, with a border line between the movable plate parts 52 and a general surface part 11a of the backboard 11 as an original point of bending. Each of the movable plate parts 52 may slide downward and rearward along each of the seat side shields 20, followed by each of the second cover surface parts 41b, for example from a position shown in FIG. 5 to a position shown in FIG. 3. This prevents each of the movable plate parts 52 from being strongly subjected to interference by each of the seat side shields 20, during rearward reclining of the seatback 10.

As shown in FIG. 3, the second cover surface parts 41b, positioned in the left and right areas of the extension surface part 41, may be bent downward by reclining the seatback 10 rearward. The first cover surface part 41a, positioned in the center area in the left and right direction of the extension surface part 41, may also be bent downward due to the movement of the left and right second cover surface parts 41b. As shown in FIG. 4, the fixing plate part 51 may recline rearward, together with the backboard 11. The fixing plate part 51 may not be joined to the first cover surface part 41a. Therefore, the fixing plate part 51 does not follow the rearward bending of the first cover surface part 41a. Even if the bent first cover surface part 41a is shifted forward and abuts the storage box JB, the first cover surface part 41a may flexibly bend. This prevents the first cover part 41a of the carpet 40 from being strongly subjected to interference by the storage box JB.

As described-above, the rear seat 1 is a vehicle seat and may be structured as follows. As shown in FIGS. 2 and 5, the rear seat 1 may include a planar gap concealing member 40 laid between the lower part of the back lining of the seatback 10 and the deck board DB behind the lower part of the seatback 10. The support plate 50 may support the gap concealing member 40 from underneath when the seatback 10 is collapsed forward. The support plate 50 may include movable plate parts 52 and a fixing plate part 51. The movable plate parts 52 may be joined to the back surface of the gap concealing member 40. The movable plate parts 52 may abut the seat side shields 20, which are configured to cover the sides of the seat main body 10, when the seatback 10 is collapsed forward. The fixing plate part 51 may be fixed on the back lining surface of the seatback 10 and by be aligned with the movable plate parts 52 in the width direction when the seatback 10 is collapsed forward. The fixing plate part 51 may abut the rear side of the gap concealing member 40 when the seatback 10 is collapsed forward. The movable plate parts 52 may abut the seat side shields 20 from behind and may be shifted relatively away from the fixing plate part 51, which is tilted with the seatback 10, when the seatback 10 is reclined rearward.

As described above, the gap concealing member 40, which is configured to conceal the gap between the seatback 10 and the deck board DB, may be bent when, for example, the seatback 10 is moved from the collapsed-forward state, as shown in FIG. 5, to the reclined-rearward state, as shown in FIG. 3. For example, the gap concealing member 40 may be deformed so as to have a bent part at its lower side. The movable plate parts 52 of the support plate 50, which may function for supporting the gap concealing member 40, may be abutted to the seat side shields 20. The fixing plate part 51 of the support plate 50, which does not abut to the seat side shields 20, may be tilted with the seatback 10, so as to move away from the movable plate parts 52. At this moment, the gap concealing member 40 may bend in a relatively flexible manner. The gap concealing member 40 may thus bent without being subjected to strong interference by the seat side shields 20.

As shown in FIG. 4, the fixing plate part 51 may be the extension part 11*b* of the backboard 11. Again, the backboard 11 covers the back lining surface of the seatback 10. Therefore, the fixing plate part 51 may be formed utilizing the structure of the backboard 11. For example, the fixing plate part 51 and the backboard 11 may be formed as one member, or may be integrally formed.

As shown in FIGS. 3 and 4, the gap concealing member 40 may include extension areas 41*a*, 41*b* extending from the end edge of the seatback 10 attached to the back lining surface toward the deck board DB. The movable plate parts 52 may include a first area 52*a* near the portion of the seatback 10 in the extension area 41*b* of the gap concealing member 40. The first area 52*a* may be joined to the rear surface of the gap concealing member 40. The movable plate part 52 may also include a second area 52*b* near the portion of the deck board DB in the extension area 41*b* of the gap concealing member 40. The second area 52*b* may not be joined to the rear surface of the gap concealing member 40.

Therefore, the force when the seatback 10 is raised, which causes the gap concealing member 40 to be pulled by the seatback 10, is smaller than the case where the entire area of the movable plate parts 52 is joined to the gap concealing member 40.

As shown in FIGS. 5 and 7, the fixing plate part 51 may include claw portions 51*a*, which abut the movable plate parts 52 from the bottom and supports the movable plate parts 52 when the seatback 10 is collapsed forward. The claw portions 51*a* thus support the movable plate parts 52 so that the rigidity of the support plate 50 is appropriately enhanced.

As shown in FIG. 5, the seat side shields 20 may be positioned lower than the back lining surface of the seatback 10 when the seatback 10 is collapsed forward. This may allow the movable plate parts 52, which cover the seat side shields 20 in this position, to prevent the gap concealing member 40 from being pushed upward when the seatback 10 is collapsed forward, as shown in FIG. 5. It is thus possible, for example, to make the gap concealing member 40 be more flush with the deck board DB.

The present disclosure may be carried out in various forms alternative to the above-described embodiments. For example, the vehicle seat may be employed to various vehicles other than an automobile, such as trains, aircrafts, and ships.

The seat side shields 20 may be provided on both left and right sides of the seatback, as described above. Alternatively, the seat side shield may be attached to only one of the left and right sides of the seatback. Accordingly, the movable plate part (for example, movable plate part 52) may also be provided on one of either the left or right sides. The seat main body may be a seatback as described above. Alternatively, the seat main body may also be a seat cushion or may have a structure with a combination of a seatback and a seat cushion.

In the above-described embodiments, the carpet 40 may cover the entire back lining surface of the seatback 10 and the gap T defined between the seatback 10 and the deck board DB. Alternatively, the gap concealing member (for example the carpet 40) may be configured to cover only the area between the lower part of the back lining of the seat back and the deck board. The gap concealing member may be bent as the seat back 10 is reclined, as described above. Alternatively, one end of the gap concealing member may be connected to the seatback 10 by a hinge, and may rotate relative to the seat back 10 as the seatback 10 is reclined. This structure may avoid strong abutment of the movable plate parts with the seat side shields from behind.

According to the above-described embodiments, the first cover surface part 41*a* of the carpet 40 is not subjected to interference by the storage box JB. Alternatively, the first cover surface part of the gap concealing member (for example, the carpet 40) may be subjected to interference by a projecting member, such as a storage box or the like, while being bent. Even with such a structure, it is possible to avoid the first cover surface part being subjected to strong interference by the projecting member since the first cover surface part bends flexibly.

As shown in FIG. 5, the movable plate part 52 is not subjected to interference by a projecting member, such as a storage box or the like, when projecting rearward from the seat side shield 20. In this respect, the movable plate part 52 may be joined across both the first cover surface part and the second cover surface part of the gap concealing member during the entire movement range. Referring to FIG. 7, the movable plate part 52 and the fixing plate part 51 may be adjacent to each other in the seat width direction. Alternatively, the movable plate part 52 and the fixing plate part 51 may be arranged so as to overlap in the seat width direction.

The various examples described in detail above, with reference to the attached drawings, are intended to be representative of the present disclosure, and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, so as to provide an improved vehicle seat, and/or methods of making and using the same.

What is claimed is:

1. A vehicle seat, comprising:
a gap concealing member positioned between a lower part of a back lining of a seatback and a deck board located behind the seatback; and
a support plate configured to support the gap concealing member from underneath when the seatback is collapsed forward, the support plate comprising
a fixing plate part fixed on a back lining surface of the seatback and abutted to a rear side of the gap concealing member when the seatback is collapsed forward; and
a movable plate part aligned with the fixing plate part in a seat width direction when the seatback is collapsed forward and joined to the rear surface of the gap concealing member, wherein:
the movable plate part covers a seat side shield when the seatback is collapsed forward,
the seat side shield is configured to cover a side of a seatback main body,
the movable plate part abuts the seat side shield from behind when the seatback is reclined rearward, and the movable plate part is configured to shift away from the fixing plate part when the seatback is reclined rearward.

2. The vehicle seat according to claim 1, wherein:
the fixing plate part extends from a backboard, and
the backboard covers the back lining surface of the seatback.

3. The vehicle seat according to claim 1, wherein:
the movable plate part extends from an attachment location, where the gap concealing member is attached to the back lining surface of the seat back, toward the deck board, the movable plate part further comprises a first end joined to the rear surface of the gap concealing member adjacent the attachment location, and
the movable plate part further comprises a second end not joined to the rear surface of the gap concealing member, the second end being spaced apart from the attachment location.

4. The vehicle seat according to claim 1, wherein:
the fixing plate part comprises a claw portion, and
the claw portion abuts the movable plate part from the bottom so as to support the movable plate part when the seatback is collapsed forward.

5. The vehicle seat according to claim 1, wherein the seat side shield is positioned below the back lining surface of the seatback when the seatback is collapsed forward.

6. A vehicle seat, comprising:
a seatback that is movable to tilt in a frontward-rearward direction of a vehicle;
a gap concealing member positioned between the seatback and a deck board; and
a support plate comprising a fixing plate part and a movable plate part, wherein:
the movable plate part is attached to the gap concealing member, and
the fixing plate part is not attached to the gap concealing member and is provided on the seatback so as to be movable with the seatback during a tilting of the seatback in the frontward-rearward direction.

7. The vehicle seat according to claim 6, wherein the fixing plate part and a backboard of the seatback are integrated to be a single unitary plate.

8. The vehicle seat according to claim 7, wherein the backboard covers a back lining surface of the seatback and extends in a seat width direction, and the backboard and the fixed plate part are integrated such that the fixed plate part extends downwardly from a lower end of the backboard extending in the seat width direction to provide a flat surface of the integrated backboard and fixed plate part.

9. The vehicle seat according to claim 6, wherein the gap concealing member is integrally formed with a back lining of the seatback.

10. The vehicle seat according to claim 6, wherein the fixing plate part is configured to contact a lower surface of the gap concealing member when the seatback is collapsed forward.

11. The vehicle seat according to claim 10, wherein the fixing plate part is configured to be spaced apart from the gap concealing member when the seatback is reclined rearward.

12. The vehicle seat according to claim 6, wherein the movable plate part has an unjoined area not attached to the gap concealing member.

13. The vehicle seat according to claim 12, wherein the unjoined area of the movable plate part is configured to contact a lower surface of the gap concealing member when the seatback is collapsed forward.

14. The vehicle seat according to claim 6, wherein the fixing plate part and the movable plate part are configured to be aligned in a seat width direction when the seatback is collapsed forward.

15. The vehicle seat according to claim 14, wherein the fixing plate part and the movable plate part are configured to be misaligned in the seat width direction when the seatback is reclined rearward.

16. The vehicle seat according to claim 6, wherein the movable plate part is configured to contact a seat side shield when the seatback is reclined rearward.

17. The vehicle seat according to claim 16, wherein the movable plate part and the gap concealing member are configured to overlap the seat side shield when the seatback is collapsed forward.

18. The vehicle seat according to claim 6, wherein:
a claw portion projects from the fixed plate part, and
the claw portion is configured to contact and support the movable plate part when the seatback is collapsed forward.

19. The vehicle seat according to claim 6, wherein a cushioning material is positioned on a side of the movable plate part opposite to the gap concealing member.

* * * * *